United States Patent [19]

Wiblin

[11] Patent Number: 4,558,194
[45] Date of Patent: Dec. 10, 1985

[54] FOOT PEDAL SWITCH
[75] Inventor: Wayne T. Wiblin, Ashtabula, Ohio
[73] Assignee: Towmotor Corporation, Mentor, Ohio
[21] Appl. No.: 591,742
[22] Filed: Mar. 21, 1984
[51] Int. Cl.[4] .............................................. H01H 3/14
[52] U.S. Cl. ................................. 200/61.89; 200/86.5
[58] Field of Search .................. 200/85 R, 86 R, 86.5, 200/5 A, 61.89; 74/474, 512

[56] References Cited

U.S. PATENT DOCUMENTS

| | | | |
|---|---|---|---|
| 2,968,967 | 1/1961 | Ross, Jr. | 74/472 |
| 3,308,253 | 3/1967 | Krakinowski | 200/46 |
| 3,699,294 | 10/1972 | Sudduth | 200/86 R X |
| 4,064,769 | 12/1977 | Amdall et al. | 74/878 |
| 4,179,949 | 12/1979 | Hildebrecht | 74/474 |
| 4,192,399 | 3/1980 | Otteson | 200/61.89 X |
| 4,245,527 | 1/1981 | Hildebrecht | 74/874 |
| 4,250,768 | 2/1981 | Hildebrecht | 74/512 |
| 4,267,544 | 5/1981 | Wiblin | 338/32 |
| 4,343,973 | 8/1982 | Main | 200/5 A X |
| 4,364,022 | 12/1982 | Melocik | 338/32 |
| 4,439,650 | 3/1984 | Brown | 200/61.89 |

FOREIGN PATENT DOCUMENTS

| | | |
|---|---|---|
| 2443357 | 4/1975 | Fed. Rep. of Germany ... 200/61.89 |
| Ad.58181 | 9/1953 | France . |
| 2399926 | 3/1979 | France . |

Primary Examiner—J. R. Scott
Attorney, Agent, or Firm—Stephen L. Noe

[57] ABSTRACT

Single pedal vehicle speed and direction controls are advantageously applied in industrial vehicles. Available pedals are prone to damage in an industrial environment and require multiple discrete pedal portions for various pedal functions. The instant apparatus provides a simple and durable foot pedal having a unitary pad including first and second integral moveable members and respective sealed switchable members. The pad is advantageously of one piece molded rubber construction and includes first and second resilient portions, each having a curvilinear connecting portion and an intermittent substantially solid connecting portion. The switchable members include respective sealed membrane switches, each having first and second spaced apart electrically conductive contact surfaces. At least one of the first and second conductive contact surfaces is attached to a flexible polymer film and is maintained separated from the other first and second conductive contact surfaces by a pressure medium contained within an enclosed pressurable chamber. The respective pressurable chambers are connected to one another and to a common pressure medium reservoir by respective interconnecting passageways. The instant apparatus is both durable and reliable when used in an industrial environment, and is of relatively simple and inexpensive construction.

9 Claims, 6 Drawing Figures

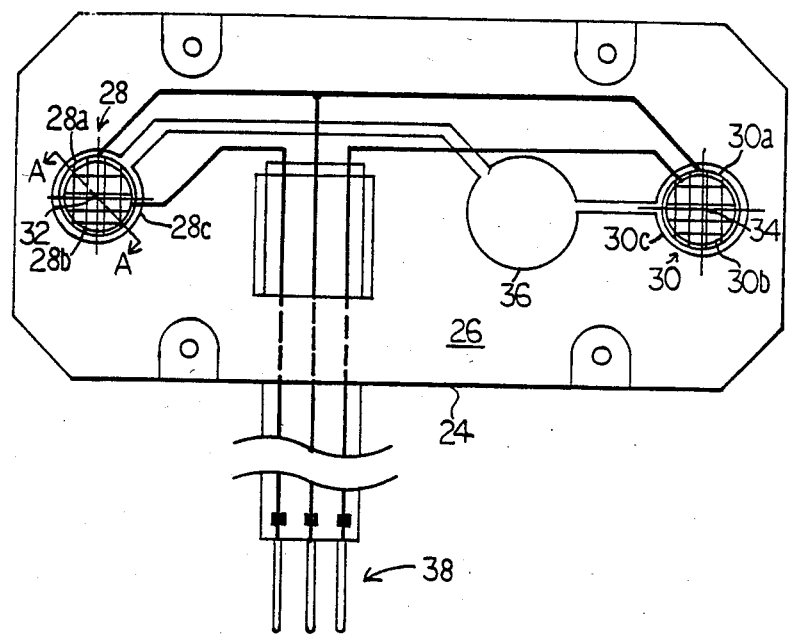
FIG. 2
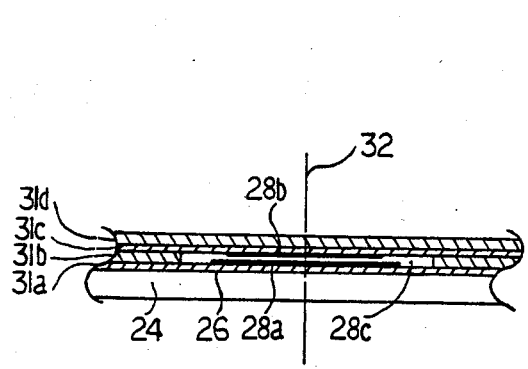
Fig.3 SECTION A-A
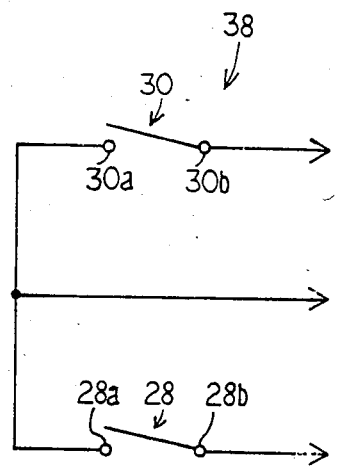
Fig.4

4,558,194

FOOT PEDAL SWITCH

DESCRIPTION

1. Technical Field

This invention relates generally to an apparatus for controlling the movement of a vehicle and, more particularly, to a foot pedal assembly for controlling a plurality of vehicle movement functions.

2. Background Art

In the past, vehicles, such as lift trucks, have advantageously been provided with combined vehicle speed and direction controls. Such combined controls typically include a foot pedal moveable for speed control, and one or more independent foot pedal switches attached to the foot pedal and moveable for direction control. Such arrangement facilitates control of both vehicle speed and forward and reverse vehicle direction with a single, foot operated, control.

Conventional foot operated direction controls typically include forward and reverse pedal portions connected to the main foot pedal. Movement of the pedal portions operates respective mechanical switches mounted on the main pedal. Such switches, typically of the push-button micro-switch variety, are prone to mechanical failure and to atmospheric contamination. Additionally, the discrete pedal portions must be assembled to the main pedal, for example with hinges or other flexible mounting devices.

A further advance in the art replaces the failure prone mechanical switches with Hall effect switches and magnetic actuators. Such assemblies avoid the problem of atmospheric contamination but add complexity to the pedal and continue to require mechanical assembly of the pedal portions to the main pedal.

In view of the above problems, it is advantageous to provide a pedal assembly that is substantially free from failure prone devices, easy to assemble without need for independent discrete pedal portions, and incorporates durable, rugged and inexpensive construction.

The present invention is directed to overcoming one or more of the problems as set forth above.

DISCLOSURE OF THE INVENTION

In one aspect of the present invention an apparatus is provided with a base having a substantially planar surface. First and second switchable members are connected to the base, each having an axis extending substantially perpendicular to the planar surface. Also connected to the base is a pad having first and second moveable members. The pad and moveable members are of unitary construction. Each of the moveable members has a contact surface lying in a plane substantially parallel to the base planar surface and axially aligned with respective ones of the first and second switchable members.

The present invention provides a pedal assembly that is substantially free from failure prone devices, easy to assemble, and of durable, rugged and inexpensive construction. The foregoing and other advantages are apparent in view of the following detailed description of the invention when considered in conjunction with the accompanying drawings. The drawings are not intended as a definition of the invention but are for the purpose of illustration only.

BRIEF DESCRIPTION OF THE DRAWINGS

For a better understanding of the present invention, reference may be made to the accompanying drawings, in which:

FIG. 2 is a pictorial view of a switch assembly used in conjunction with an embodiment of the present invention;

FIG. 3 is a sectional view of a portion of the switch assembly of FIG. 2;

FIG. 4 is a schematic diagram of the switch assembly of FIG. 2;

BEST MODE FOR CARRYING OUT THE INVENTION

Figure 1:
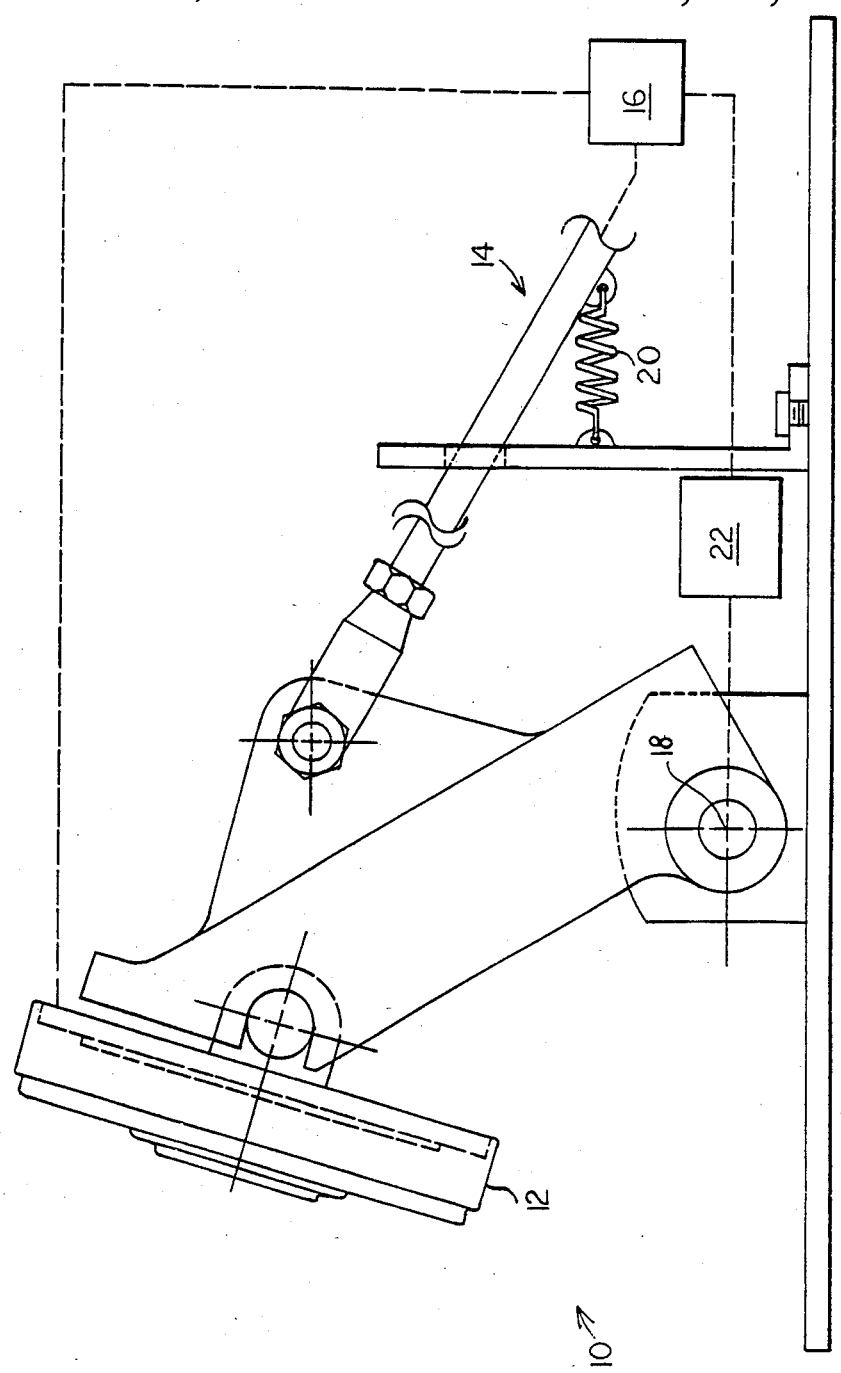
FIG. 1 is a plan view illustrating an embodiment of the present invention.

Referring first to FIG. 1, an apparatus embodying certain of the principles of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

The apparatus 10 includes a pedal 12, for example, an accelerator pedal of a vehicle such as an electric lift truck. The pedal 12 is connected through linkage 14 to a vehicle control mechanism 16. The control mechanism 16 exercises, for example, control over vehicle speed and direction in response to speed and direction command signals, as is well-known in the art.

The pedal 12 is shown to have a swing motion about an axis 18. Pressure on the pedal 12 sufficient to overcome the bias of a spring 20 moves the pedal 12 about the axis 18. The degree of motion of the pedal 12 about the axis 18 is translated into a speed command signal, for example by an encoder 22, and the command signal is delivered to the control mechanism 16.

Pressure on preselected portions of the pedal 12 is translated into direction command signals as is hereinafter described. These direction command signals are likewise delivered to the control mechanism 16.

Referring now to FIG. 2, the pedal 12 includes a base 24 having a substantially planar surface 26. In the preferred embodiment, the base 24 is an aluminum plate. Connected to the base planar surface 26 are first and second switchable members 28,30, each having a respective axis 32,34 extending substantially perpendicular to the base planar surface 26.

The switchable members 28,30 are, for example, membrane switches, each having first and second spaced apart conductive contacts 28a,28b,30a,30b separated by an enclosed pressurable chamber 28c,30c. Each of the pressurable chambers 28c,30c is connected for pressure communication with the other of the pressurable chambers 28c,30c and with an associated pressure reservoir 36. In the preferred embodiment, the pressure medium is a substantially non-conductive gas, for example, air, contained at one atmosphere. The contacts 28a,30a,28b,30b are connected by respective conductive lines to a terminal block 38. In the preferred embodiment, the contacts 28a,30a,28b,30b and the connecting lines are flexible conductors deposited or positioned on layers of polymer film.

The switchable members 28,30 are provided by assembly of layers of polymer film on the base 24, in the relationship shown in FIG. 3. A first layer of film 31a is applied directly to the base planar surface 26. The first conductive contact 28a is positioned on the first layer of film 31a. A second layer of film 31b is applied over the first layer 31a and functions as a spacer. The second layer of film 31b includes a cut out portion surrounding the contact 28a. A third layer of film 31c is applied over the second layer 31b with the second conductive contact 28b positioned on the third layer 31c. The second conductive contact 28b is maintained adjacent and substantially parallel to but separated from the first conductive contact 28a. The cut out portion of the second layer of film 31b is thus enclosed by the first and third layers of film 31a,c and is the pressurable chamber 28c. Finally, a fourth protective layer of film 31d is applied over the third layer 31c. Such an assembly is commonly known as a membrane switch and is relatively impervious to atmospheric contamination owing to the completely sealed construction. Although FIG. 3 depicts only one of the switchable members 28,30 in cross section, the other of the switchable members 28,30 is similarly constructed and includes elements corresponding to those discussed above.

The switchable members 28,30 and the electrical relationship of one to the other is depicted in the schematic representation at FIG. 4. Each switchable member 28,30 is seen to include a first contact 28a,30a connected in common to a single conductor, and a second contact 28b,30b connected to respective individual conductors.

Figure 5:
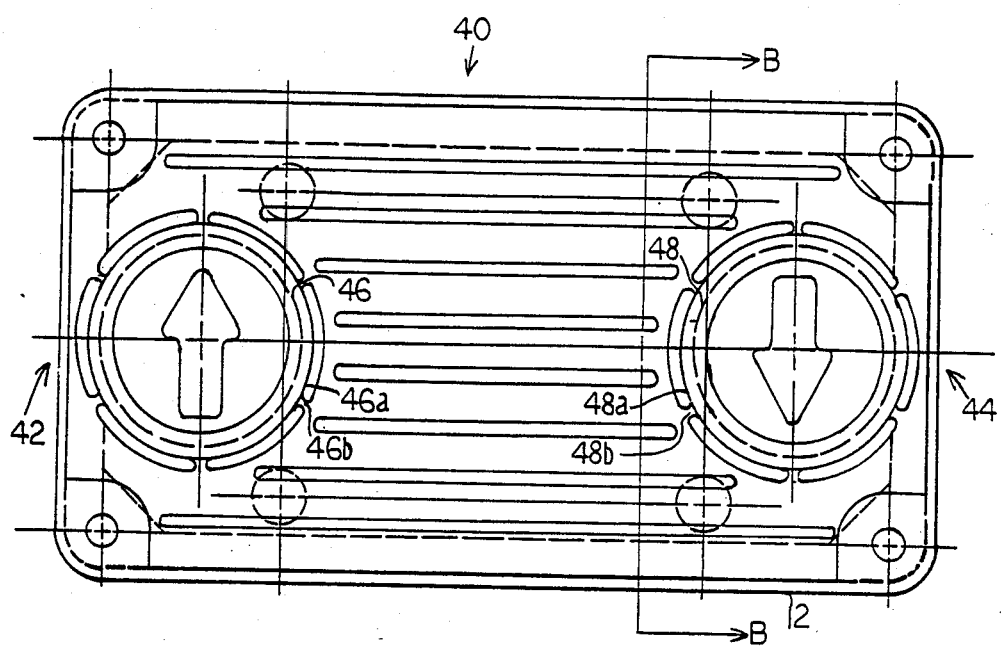
FIG. 5 is a top projection of a pedal used in conjunction with an embodiment of the present invention; and, FIG. 6 is a partially sectioned edge projection of the pedal of FIG. 5.

Referring now to FIG. 5, the pedal 12 also includes a pad 40 having first and second integral moveable members 42,44. The pad is constructed of flexible, molded material, for example, rubber, and is of one piece or unitary construction. The moveable members 42,44 are attached to the pad 40 by respective molded resilient portions 46,48, best seen in the partially sectioned view of the pad 40 at FIG. 6. Adverting to FIG. 5, the resilient portions 46,48 each include a curvalinear connecting portion 46a,48a and one or more intermittent substantially solid connecting portions 46b,48b. The resilient portions 46,48 connect the respective moveable members 42,44 to the remainder of the pad 40 while maintaining the moveable members 42,44 controllably free to move independently of the pad 40 in response to a force applied to the respective moveable member 42,44.

Movement of the moveable members 42,44 with respect to the pad 40 occurs at a predetermined spring rate determined by the particular construction of the respective resilient portions 46,48. The spring rate is primarily determined by the properties of the molding material, the cross sectional area of the resilient members 46,48, and the ratio of the curvalinear connecting portion 46a,48a to the substantially solid connecting portions 46b,48b. In the preferred embodiment, the predetermined spring rate is in a range of 1 to 15 pounds. A force applied to one of the moveable members 42,44 in excess of the predetermined spring rate causes the respective moveable members 42,44 to move relative to the pad 40.

Those skilled in the art will recognize that, although resilient portions 46,48 having preselected geometric forms are used in the preferred embodiment, other arrangements and constructions of the resilient portions 46,48 can be readily incorporated in the pedal 12.

Figure 6:
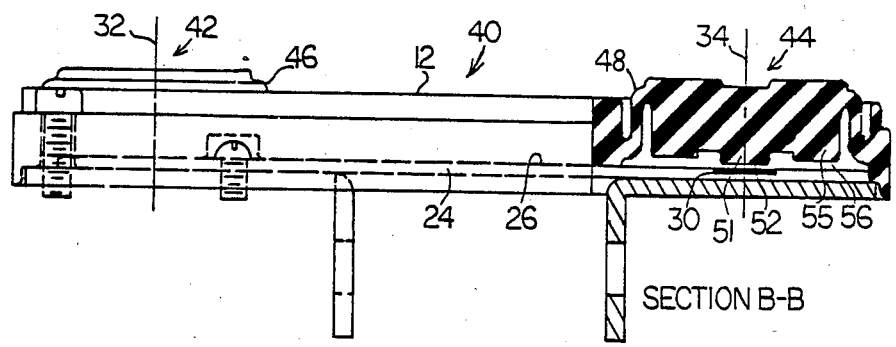

Referring now to FIG. 6, the sectioned portion shows that the second moveable member 44 includes a second contact portion 51 having a second contact surface 52. The pad 40 is connected to the base 24 with the second contact surface 52 lying in a plane substantially parallel to the base planar surface 26. The second contact surface 52 is aligned with the second switchable member 30 along the axis 34. A second stop portion 55, substantially cylindrical in shape, surrounds the second contact portion 51, and includes a second stop surface 56 lying in a plane substantially parallel to the second contact surface 52 and displaced from it by a predetermined amount.

Although FIG. 6 depicts only the second moveable member 44 in cross-section, the first moveable member 42 is similarly constructed, and includes elements corresponding to those discussed above, for example, first contact portion 49, first contact surface 50, first stop portion 53, and first stop surface 54.

Industrial Applicability

Operation of the apparatus 10 is best described in relation to its use on a vehicle, for example, an industrial vehicle such as an electric lift truck.

The spring rate of the resilient portions 46,48 is selected to be less than the spring rate of the spring 20. Therefore, in response to a force greater than the spring rate of the resilient portion 46,48 being applied to the pad 40, one of the first and second contact surfaces 50,52 closes the respective switchable member 28,30 by displacing the pressure medium into the reservoir 36. The result is a direction command signal which is delivered by the flexible conductors to the control mechanism 16. Excessive displacement of the switchable members 28,30 is prevented by the stop portions 53,55. Owing to the large cross-sectioned area of the stop portions 53,55 relative to the contact portions 49,51, the stop portions 53,55 effectively limit the travel of the contact portions 49,51 and prevent damage to the switchable members 28,30.

Additional pressure on the pad 40 in excess of the spring rate of the spring 20 moves the pedal 12 about the axis 18. The pedal position is encoded by the encoder 22 and delivered as a speed command signal to the control mechanism 16. The control mechanism 16 responds, for example, by propelling the vehicle at the command speed in the command direction. The difference in spring rates between the resilient portion 46,48 and the spring 20 insures that a direction will normally be selected before a speed command is produced.

The control mechanism 16 can be constructed to ignore any speed command signal not preceded by a direction command signal, for example, in the event the operator manages to avoid contact with the moveable members 42,44 but moves the pedal 12. Also, the control mechanism 16 can ignore simultaneous selection of multiple directions, for example, in the event the operator simultaneously depresses both of the moveable members 42,44. Either of these situations can advantageously cause the vehicle to remain in a neutral mode of operation. The necessary circuitry, either hardware or software, to accomplish such error checking functions is readily incorporated in the control mechanism 16 by one skilled in the electronics art and is not an object of this invention.

Other aspects, objects, advantages and uses of this invention can be obtained from a study of the drawings, the disclosure, and the appended claims.

I claim:

1. A pedal, comprising:
a base having a substantially planar surface,
first and second switchable members connected to said base planar surface, each of said switchable members having a respective axis extending substantially perpendicular to said base planar surface, said first and second switchable members including respective first and second membrane switches, each of said first and second membrane switches having first and second spaced apart electrically conductive contact surfaces, at least one of said first and second electrically conductive contact surfaces being attached to a flexible polymer film and maintained separated from the other of said first and second electrically conductive contact surfaces by a pressure medium contained within an enclosed pressurable chamber, said flexible polymer film forming one wall of said enclosed pressurable chamber, said respective pressurable chambers being connected each to the other and to a common pressure medium reservoir by respective passageways; and
a pad having first and second integral movable members, each of said movable members having a respective contact surface, said pad being connected to said base, said movable member contact surfaces lying in a plane substantially parallel to said base planar surface, each of said movable member contact surfaces being aligned with and adjacent a respective one of said first and second switchable members along the associated respective axis, said pad and said movable members being of unitary construction.

2. A pedal, as set forth in claim 1, including first and second resilient portions and wherein said first and second moveable members are connected to said pad by said respective resilient portions.

3. A pedal, as set forth in claim 2, wherein said resilient portions have a predetermined spring rate relative to said pad and said respective moveable members.

4. A pedal, as set forth in claim 3, wherein each of said moveable members is controllably free to move independently of said pad in response to a force applied to said respective moveable member in excess of said predetermined spring rate.

5. A pedal, as set forth in claim 4, wherein said predetermined spring rate is in a range of 1 to 15 pounds.

6. A pedal, as set forth in claim 2, wherein said resilient portions each include a curvilinear connecting portion and an intermittent substantially solid connecting portion.

7. A pedal, as set forth in claim 6, wherein said pad is constructed of molded rubber.

8. A pedal, comprising:
a base having a substantially planar surface;
first and second switchable members connected to said base planar surface, each of said switchable members having a respective axis extending substantially perpendicular to said base planar surface; and,
a one piece molded rubber pad having first and second moveable members, each of said moveable members being connected to said pad by a respective resilient portion having a curvilinear connecting portion and an intermittent substantially solid connecting portion, said pad being connected to said base planar surface and each of said first and second moveable members being independently moveable with respect to said pad and said base at a predetermined spring rate along respective ones of said axes.

9. A pedal, as set forth in claim 8, wherein said first and second switchable members include respective first and second membrane switches, each of said first and second membrane switches having first and second spaced apart electrically conductive contact surfaces, at least one of said first and second electrically conductive contact surfaces being attached to a flexible polymer film and maintained separated from the other of said first and second electrically conductive contact surfaces by a pressure medium contained within an enclosed pressurable chamber, said flexible polymer film forming one wall of said enclosed pressurable chamber, said respective pressurable chambers being connected each to the other and to a common pressure medium reservoir by respective passageways.

* * * * *